US012659047B2

(12) United States Patent
Moon et al.

(10) Patent No.: US 12,659,047 B2
(45) Date of Patent: Jun. 16, 2026

(54) QUANTUM-ENTANGLED PHOTON-PAIR LIGHT SOURCE USING CHIP-SCALE ATOMIC VAPOR CELL AND IMPLEMENTATION METHOD THEREOF

(71) Applicant: Pusan National University Industry-University Cooperation Foundation, Busan (KR)

(72) Inventors: Han-Seb Moon, Busan (KR); Hee Woo Kim, Busan (KR)

(73) Assignee: SDT INC., Seoul (KR)

( * ) Notice: Subject to any disclaimer, the term of this patent is extended or adjusted under 35 U.S.C. 154(b) by 425 days.

(21) Appl. No.: 18/331,955

(22) Filed: Jun. 9, 2023

(65) Prior Publication Data

US 2023/0412280 A1     Dec. 21, 2023

(30) Foreign Application Priority Data

Jun. 15, 2022     (KR) ......................... 10-2022-0072718

(51) Int. Cl.
| | |
|---|---|
| *H04B 10/70* | (2013.01) |
| *B82Y 10/00* | (2011.01) |
| *B82Y 20/00* | (2011.01) |
| *G02B 6/26* | (2006.01) |
| *G06N 10/40* | (2022.01) |

(52) U.S. Cl.
CPC ............. *H04B 10/70* (2013.01); *G06N 10/40* (2022.01); *B82Y 10/00* (2013.01); *B82Y 20/00* (2013.01); *G02B 6/264* (2013.01)

(58) Field of Classification Search
CPC ........ H04B 10/70; G06N 10/40; B82Y 10/00; B82Y 20/00; G02B 6/264; G02F 1/353; G02F 1/3536; H01S 5/3404; H01S 5/183; H01S 5/185; G04F 5/14; G04F 5/145
See application file for complete search history.

(56) References Cited

U.S. PATENT DOCUMENTS

| | | | |
|---|---|---|---|
| 2008/0258049 A1 | 10/2008 | Kuzmich et al. | |
| 2024/0129045 A1* | 4/2024 | Namazi ................... | G02F 1/211 |

FOREIGN PATENT DOCUMENTS

| | | |
|---|---|---|
| JP | 2007101674 A | 4/2007 |
| KR | 20190012620 A | 2/2019 |
| KR | 102178846 B1 | 11/2020 |
| KR | 102274792 B1 | 7/2021 |

(Continued)

OTHER PUBLICATIONS

Hasegawa, M., et al. "Microfabrication of cesium vapor cells with buffer gas for MEMS atomic clocks." Sensors and Actuators A: Physical 167.2 (2011): 594-601. (Year: 2011).*

(Continued)

*Primary Examiner* — Ryan Johnson
(74) *Attorney, Agent, or Firm* — CANTOR COLBURN LLP

(57) ABSTRACT

Disclosed are a quantum-entangled photon-pair light source using a chip-scale atomic ensemble and implementation method thereof. The quantum-entangled photon-pair light source may include an atomic vapor cell configured to generate cesium (Cs) vapor to fill a photon-pair chamber and a processor configured to cause a coupling laser and a pump laser to travel based on the photon-pair chamber and generate a photon pair of a signal and an idler from the atomic vapor cell.

15 Claims, 9 Drawing Sheets

(56) References Cited

FOREIGN PATENT DOCUMENTS

| KR | 1020210154364 | A | 12/2021 |
|----|----------------|---|---------|
| KR | 20220040053 | A | 3/2022 |

OTHER PUBLICATIONS

E. A. Donley et al., "Nuclear quadrupole resonances in compact vapor cells: The crossover between the NMR and the nuclear quadrupole resonance interaction regimes," Physical Review A, 2009, pp. 013420-1-013420-5, The American Physical Society.

Galan Moody et al., "Chip-scale nonlinear photonics for quantum light generation," AVS Quantum Sci., 2020, pp. 041702-1-041702-20.

Heewoo Kim et al., "Photon-pair generation from a chip-scale Cs atomic vapor cell," Optics Express, 2022, 10 pages, vol. 30, No. 13.

Li-Anne Liew et al., "Microfabricated alkali atom vapor cells," Applied Physics Letters, 2004, pp. 2694-2696, vol. 84, No. 14.

Svenja Knappe et al., "A microfabricated atomic clock," Applied Physics Letters, Aug. 2004, pp. 1460-1462, vol. 85, No. 9.

* cited by examiner

1mm

Cs dispenser

Channel

Photon-pair chamber

Lens

Pump 852nm (V)

Lens

Idler (H)

Signal (V)

Chip-scale Cs atom cell

Coupling 795nm (H)

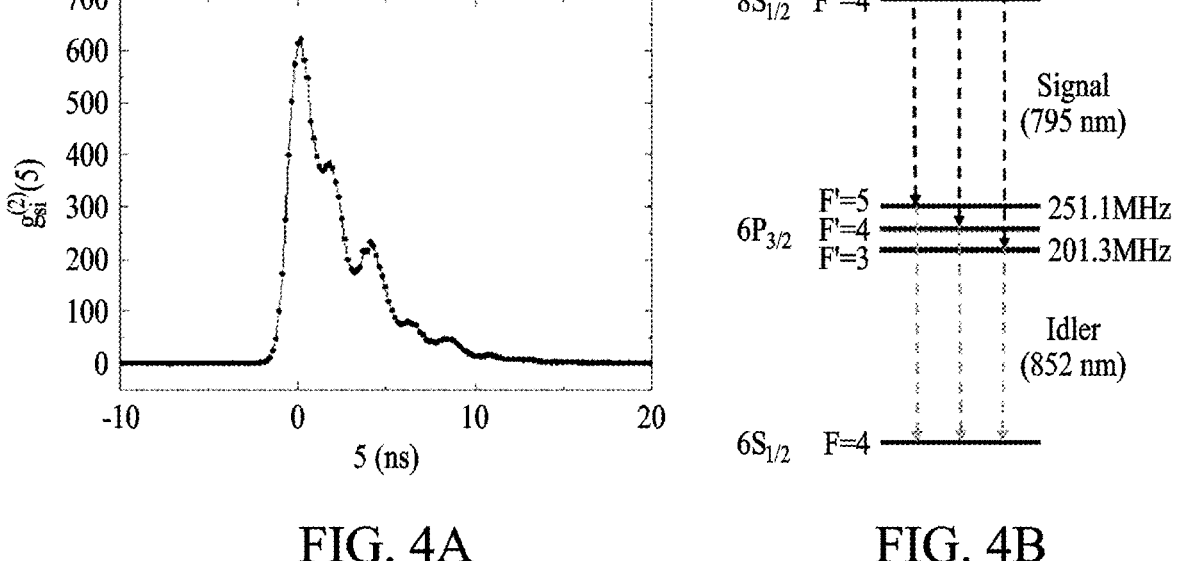
FIG. 4A                    FIG. 4B

QUANTUM-ENTANGLED PHOTON-PAIR LIGHT SOURCE USING CHIP-SCALE ATOMIC VAPOR CELL AND IMPLEMENTATION METHOD THEREOF

CROSS-REFERENCE TO RELATED APPLICATION

This application claims the benefit of Korean Patent Application No. 10-2022-0072718 filed on Jun. 15, 2022, in the Korean Intellectual Property Office, the entire disclosure of which is incorporated herein by reference for all purposes.

BACKGROUND

1. Field of the Invention

One or more embodiments relate to a quantum-entangled photon-pair light source using a chip-scale atomic ensemble and an implementation method thereof, thereby implementing a photon-pair light source that generates a polarization-entangled photon pair in a chip-scale atomic vapor cell through spontaneous four-wave mixing (SFWM).

The chip-scale atomic vapor cell of the present disclosure may be produced by placing a cesium (Cs) dispenser inside a silicon wafer having open patterns and then anodic bonding a borosilicate wafer on both sides of the silicon wafer.

2. Description of the Related Art

A quantum light source using an atomic medium may be a key element in quantum information technology based on an atom-photon interaction.

For example, when constructing a quantum network, a quantum light source may be installed at certain points along with devices, such as a quantum repeater and a quantum memory, and may be used to store and transmit quantum information.

In order to actually implement such an application, a high-quality light source may need to be generated based on atoms and through an efficient interaction with coherent light. Relevant research on various platforms is currently underway to implement such an application.

There are some issues of a complex system and a large volume on existing methods that have been proposed so far, which capture single atoms, ions, or cold atoms and utilize them as a medium of a quantum light source.

In addition, since the existing methods need a high degree of vacuum, isolated atomic samples may not be easily produced in a vacuum chamber.

However, a photon-pair light source using an alkali atomic vapor cell may need less equipment than a method using cold atoms and may thus reduce the size of its system drastically.

A photon-pair generation system using an atomic vapor cell may advantageously be smaller than a cold atomic system.

However, the photon-pair generation system using the atomic vapor cell may have an issue in that the photon-pair generation rate is reduced by two-photon Doppler broadening since atoms have a velocity.

In order to overcome such an issue caused by the two-photon Doppler broadening, a direction and an angle between lasers used in an experiment may need to be adjusted according to an atomic transition structure.

In particular, in a ladder-type structure, a light source with a high photon-pair generation rate has been experimentally implemented, considering Stimulated Four-Wave Mixing (SFWM) and a collective two-photon coherence effect between atoms. Furthermore, a polarization-entangled light source has been generated.

In recent years, there has been progress in the implementation of an atomic-based photon-pair generation system at a laboratory level and physical understanding thereof and there has been advancement in the miniaturization of vapor cells.

A chip-scale atomic clock was first produced about 20 years ago according to progress in micro-electro mechanical systems (MEMS).

Such technical progress has shown promise for the miniaturization of a system based on atomic vapor cells, such as magnetometers and gyroscopes using chip-scale atoms.

Therefore, there is a growing need for an improved model for generating a stable quantum-entangled photon-pair light source using a chip-sized atomic cell.

SUMMARY

Embodiments provide a quantum-entangled photon-pair light source using a chip-scale atomic ensemble and an implementation method thereof by implementing a photon-pair generation system using a chip-scale atomic vapor cell such that an existing photon-pair generation system may be miniaturized to a portable equipment scale.

In addition, an embodiment of the present disclosure may dramatically reduce the size of a photon-pair generation system by applying the photon-pair generation system to optical fiber array technology or optical wave technology and may develop various quantum devices, such as a quantum memory based on an atomic ensemble or a single-photon light source.

In addition, an embodiment of the present disclosure may implement a bright and powerful quantum-entangled photon-pair light source by utilizing a strong signal-idler polarization correlation using an atomic vapor cell.

In addition, an embodiment of the present disclosure may develop a quantum-entangled photon-pair light source with a high generation rate using a low pump output.

According to an aspect, there is provided a quantum-entangled photon-pair light source using a chip-scale atomic ensemble, the quantum-entangled photon-pair light source including an atomic vapor cell configured to generate cesium (Cs) vapor to fill a photon-pair chamber and a processor configured to cause a coupling laser and a pump laser to travel based on the photon-pair chamber and generate a photon pair of a signal and an idler from the atomic vapor cell.

According to an aspect, there is provided a method of implementing a quantum-entangled photon-pair light source using a chip-scale atomic ensemble, the method including generating, by an atomic vapor cell, Cs vapor to fill a photon-pair chamber and generating, by a processor, a photon pair of a signal and an idler from the atomic vapor cell by causing a coupling laser and a pump laser to travel based on the photon-pair chamber.

An embodiment of the present disclosure may provide a quantum entangled photon pair light source and an implementation method thereof using a chip-scale atomic ensemble by implementing a photon pair generation system using a chip-scale atomic vapor cell such that such that an existing photon-pair generation system may be miniaturized to a portable equipment scale.

In addition, an embodiment of the present disclosure may dramatically reduce the size of a photon-pair generation system by applying the photon-pair generation system to optical fiber array or optical wave technology and may develop various quantum devices, such as a quantum memory based on an atomic ensemble or a single-photon light source.

In addition, an embodiment of the present disclosure may implement a bright and powerful quantum-entangled photon-pair light source by utilizing a strong signal-idler polarization correlation using an atomic vapor cell.

In addition, an embodiment of the present disclosure may develop a quantum-entangled photon-pair light source with a high generation rate using a low pump output.

BRIEF DESCRIPTION OF THE DRAWINGS

These and/or other aspects, features, and advantages of the invention will become apparent and more readily appreciated from the following description of embodiments, taken in conjunction with the accompanying drawings of which:

FIGS. 4A and 4B are diagrams each illustrating a two-photon waveform according to time;

DETAILED DESCRIPTION

Figure 1:
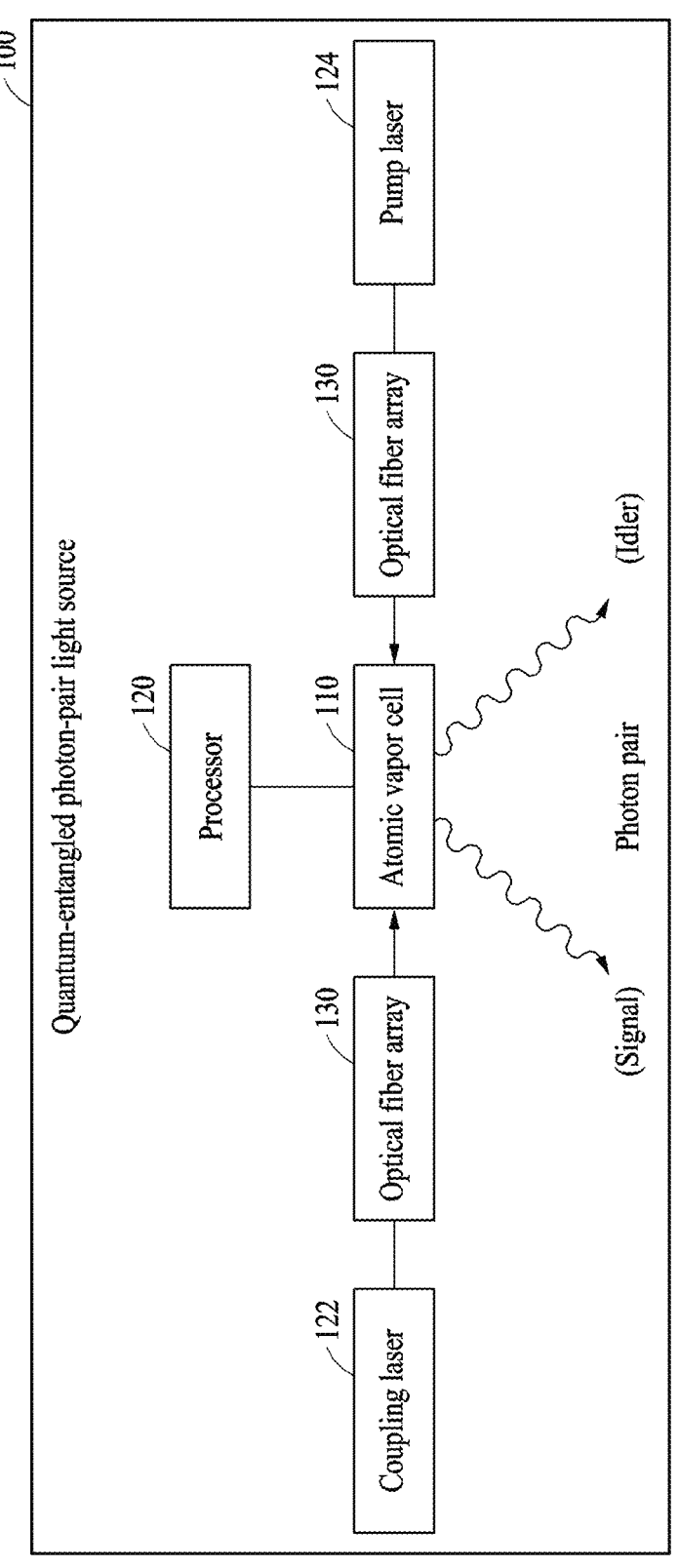
FIG. 1 is a block diagram illustrating the configuration of a quantum-entangled photon-pair light source using a chip-scale atomic ensemble, according to an embodiment.

Hereinafter, examples will be described in detail with reference to the accompanying drawings. However, various alterations and modifications may be made to the examples. Here, the examples are not meant to be limited by the descriptions of the present disclosure. The examples should be understood to include all changes, equivalents, and replacements within the idea and the technical scope of the present disclosure.

The terminology used herein is for the purpose of describing particular examples only and is not to be limiting of the examples. The singular forms "a", "an", and "the" are intended to include the plural forms as well, unless the context clearly indicates otherwise. It will be further understood that the terms "comprises/comprising" and/or "includes/including" when used herein, specify the presence of stated features, integers, steps, operations, elements, and/or components, but do not preclude the presence or addition of one or more other features, integers, steps, operations, elements, components and/or groups thereof.

Unless otherwise defined, all terms including technical and scientific terms used herein have the same meaning as commonly understood by one of ordinary skill in the art to which examples belong. It will be further understood that terms, such as those defined in commonly-used dictionaries, should be interpreted as having a meaning that is consistent with their meaning in the context of the relevant art and will not be interpreted in an idealized or overly formal sense unless expressly so defined herein.

When describing the examples with reference to the accompanying drawings, like reference numerals refer to like constituent elements and a repeated description related thereto will be omitted. In the description of embodiments, detailed description of well-known related structures or functions will be omitted when it is deemed that such description will cause ambiguous interpretation of the present disclosure.

FIG. 1 is a block diagram illustrating the configuration of a quantum-entangled photon-pair light source using a chip-scale atomic ensemble, according to an embodiment.

Referring to FIG. 1, a quantum-entangled photon-pair light source using a chip-scale atomic ensemble according to an embodiment (hereinafter, referred to as a 'quantum-entangled photon-pair light source' 100) may include a processor 120 including an atomic vapor cell 110, a coupling laser 122, and a pump laser 124. In addition, according to an embodiment, the quantum-entangled photon-pair light source 100 may be configured by selectively adding thereto an optical fiber array 130 for guiding the entry path of a laser and the detection path of a photon pair.

First, the atomic vapor cell 110 may generate cesium (Cs) vapor to fill a photon-pair chamber. That is, the atomic vapor cell 110 may generate the Cs vapor and maintain the generated Cs vapor in the closed photon-pair chamber.

The atomic vapor cell 110 may include upper and lower open patterns connected to each other by a channel.

A Cs dispenser configured to discharge the Cs vapor may be installed in the upper open pattern.

The atomic vapor cell 110 may emit the Cs vapor by concentrating lasers having a prescribed output on the Cs dispenser for a prescribed time.

The lasers concentrated on the Cs dispenser may activate the Cs vapor from the Cs dispenser by concentrating the laser at a large output of, for example, about 130 mW for about seconds.

The lower open pattern may form the photon-pair chamber filled with the Cs vapor moving through the channel.

The photon-pair chamber of the atomic vapor cell 110 may be formed of a glass tube filled with Cs vapor in a vacuum state. The Cs vapor in the atomic vapor cell 110 may be manipulated (captured, pumped, and the like) by the coupling laser 122 and the pump laser 124, which is to be described below, such that two photons, which are a signal and an idler, may be generated. In this case, the generated two photons (a photon pair) may be in a quantum entangled state.

In an embodiment, the atomic vapor cell 110 may be a chip-type cell that maintains the Cs vapor. The atomic vapor cell 110 in the form of a chip may generate, by a simple device, a photon pair that is more stable than a conventional atomic medium.

According to an embodiment, the atomic vapor cell 110 may be wrapped around with Mumetal to prevent line width broadening caused by a magnetic field. Mumetal may be a nickel alloy used to produce materials for magnetic shielding and may be one of the materials that exhibit a high magnetic permeability in a weak magnetic field.

The processor 120 may cause the coupling laser 122 and the pump laser 124 to travel based on the photon-pair chamber and thus generate a photon pair of a signal and an idler from the atomic vapor cell 110. That is, the processor 120 may include the coupling laser 122 and the pump laser 124 and generate the photon pair through the manipulation of the coupling laser 122 and the pump laser 124 that travel in directions opposite to each other, with respect to the photon-pair chamber filled with the Cs vapor.

Here, the coupling laser 122 may be a 795 nm laser of horizontal polarization and the pump laser 124 may be an 852 nm laser of vertical polarization.

The horizontal polarization may refer to polarization in the horizontal direction based on the traveling direction of a laser and the vertical polarization may refer to polarization in the vertical direction based on the traveling direction of a laser.

The coupling laser 122 and the pump laser 124 may simultaneously travel in directions opposite to each other towards the atomic vapor cell 110 at respective positions of the same distance from the atomic vapor cell 110. That is, the coupling laser 122 of the horizontal polarization and the pump laser 124 of the vertical polarization may travel in directions opposite to each other and reach the atomic vapor cell 110 at the same time such that the Cs vapor may be manipulated.

More specifically, the processor 120 may generate the photon pair, in which the signal and the idler are in a vertical polarization relationship of horizontal polarization/vertical polarization or vertical polarization/horizontal polarization, by the coupling laser 122 of the horizontal polarization and the pump laser 124 of the vertical polarization. That is, the processor 120 may cause each of the photons emitted from the atomic vapor cell 110 to travel vertically and horizontally with respect to a propagation direction according to the manipulation of the coupling laser 122 and the pump laser 124 of the vertical polarization.

In addition, the coupling laser 122 and the pump laser 124 may fix a laser frequency at +1 GHz outside a Doppler broadening region in order to reduce uncorrelated photon pairs generated by photon resonance. That is, the coupling laser 122 and the pump laser 124 may cause their laser frequency to fall within a prescribed range such that a photon pair emitted from the atomic vapor cell 110 may be in the polarization relationship of horizontal polarization/vertical polarization or vertical polarization/horizontal polarization, which is described above.

According to an embodiment, the quantum-entangled photon-pair light source 100 may be configured by adding thereto the optical fiber array 130.

The optical fiber array 130 may include multiple channels and guide the traveling paths of the coupling laser 122 and the pump laser 124 to the photon-pair chamber.

The optical fiber array 130 may include channels of three or more and may increase the multiple channels in the unit of an odd number (e.g., 5, 7, 9 . . . ).

The optical fiber array 130 may determine one (preferably, the central channel) of the multiple channels to be the traveling path of the coupling laser 122 and the pump laser 124.

The processor 120 may emit the generated photon pair outwards along the optical fiber array 130 of remaining channels of the multiple channels, except for the channel which the coupling laser 122 and the pump laser 124 enter.

That is, the processor 120 may determine the remaining channels of the optical fiber array 130, except for the channel through which the coupling laser 122 and the pump laser 124 travel, to be the travel paths of the generated photon pair.

In addition, the optical fiber array 130 may increase the number of photon pairs generated from the atomic vapor cell 110 by increasing the number of channels in the unit of an odd number.

For example, the optical fiber array 130 of three channels may use the central channel as the path of the coupling laser 122 and the pump laser 124 and use the remaining two channels as the paths of two photon pairs (a signal and an idler).

When the number of channels increases to 5, the optical fiber array 130 of five channels may use the central channel as the path of the lasers and use the remaining four channels as the paths of four photon pairs (a signal and an idler).

An embodiment of the present disclosure may provide a quantum-entangled photon-pair light source using a chip-scale atomic ensemble and an implementation method thereof by implementing a photon-pair generation system using a chip-scale atomic vapor cell such that an existing photon-pair generation system may be miniaturized to a portable equipment scale.

In addition, an embodiment of the present disclosure may dramatically reduce the size of a photon-pair generation system by applying the photon-pair generation system to optical fiber array technology or optical wave technology and may develop various quantum devices, such as a quantum memory based on an atomic ensemble or a single-photon light source.

In addition, an embodiment of the present disclosure may implement a bright and powerful quantum-entangled photon-pair light source by utilizing a strong signal-idler polarization correlation using an atomic vapor cell.

In addition, an embodiment of the present disclosure may develop a quantum-entangled photon-pair light source with a high generation rate using a low pump output.

One of the criteria for evaluating whether a high-quality photon-pair generation system has been obtained may be the photon-pair generation rate.

In order to generate maximum photon pairs with a minimum pump laser output to reduce energy loss, as many atoms as possible may need to interact with a pump laser and the interaction intensity with the pump laser may need to also be high.

An existing photon-pair generation system may use an atomic vapor cell having a length of 10 mm or more and concentrate a pump laser using a lens for a reaction with atoms with high luminous intensity.

However, the size of the existing photon-pair generation system may increase since the existing photon-pair generation system may use a lens having a focal length of hundreds of mm to produce a Rayleigh length that is longer than the length of the cell.

It may be inevitable to reduce the length of the cell in order to reduce the size of the total photon-pair generation system. The temperature of the cell may need to increase to increase the atomic density of the atomic vapor cell to the same level as the density of a long cell in conventional experiments.

Accordingly, in order to obtain a miniaturized high-quality photon-pair generation system, it may be necessary to manufacture a cell capable of withstanding a high temperature while having a short length to achieve an atomic density that is advantageous for photon pair generation.

Finally, in order to confirm whether the cell produced according to the above conditions is suitable for photon-pair generation, two generated photons may be evaluated with respect to characteristics of a light source and may be verified with respect to the possibility of miniaturization by using a single photon detector and time-correlated single photon counting (TCSPC).

According to the present disclosure, a photon-pair generation system may be implemented by using a chip-scale atomic vapor cell, such that an existing photon-pair system may be miniaturized to a portable equipment scale.

In addition, an embodiment of the present disclosure may dramatically reduce the size of a photon-pair generation system by applying the photon-pair generation system to optical fiber array technology or optical wave technology and may develop various quantum devices, such as a quantum memory based on an atomic ensemble or a single-photon light source.

The quantum-entangled photon-pair light source 100 of the present disclosure may generate a photon pair with time correlation in the atomic vapor cell 110 having a length of 1 mm.

The quantum-entangled photon-pair light source 100 may measure a change in characteristics of a light source according to the temperature of the atomic vapor cell 110 and the output of the pump laser 124.

The quantum-entangled photon-pair light source 100 may derive the idea of developing a chip-scale quantum light source.

Figures 2A, 2B, 2C:
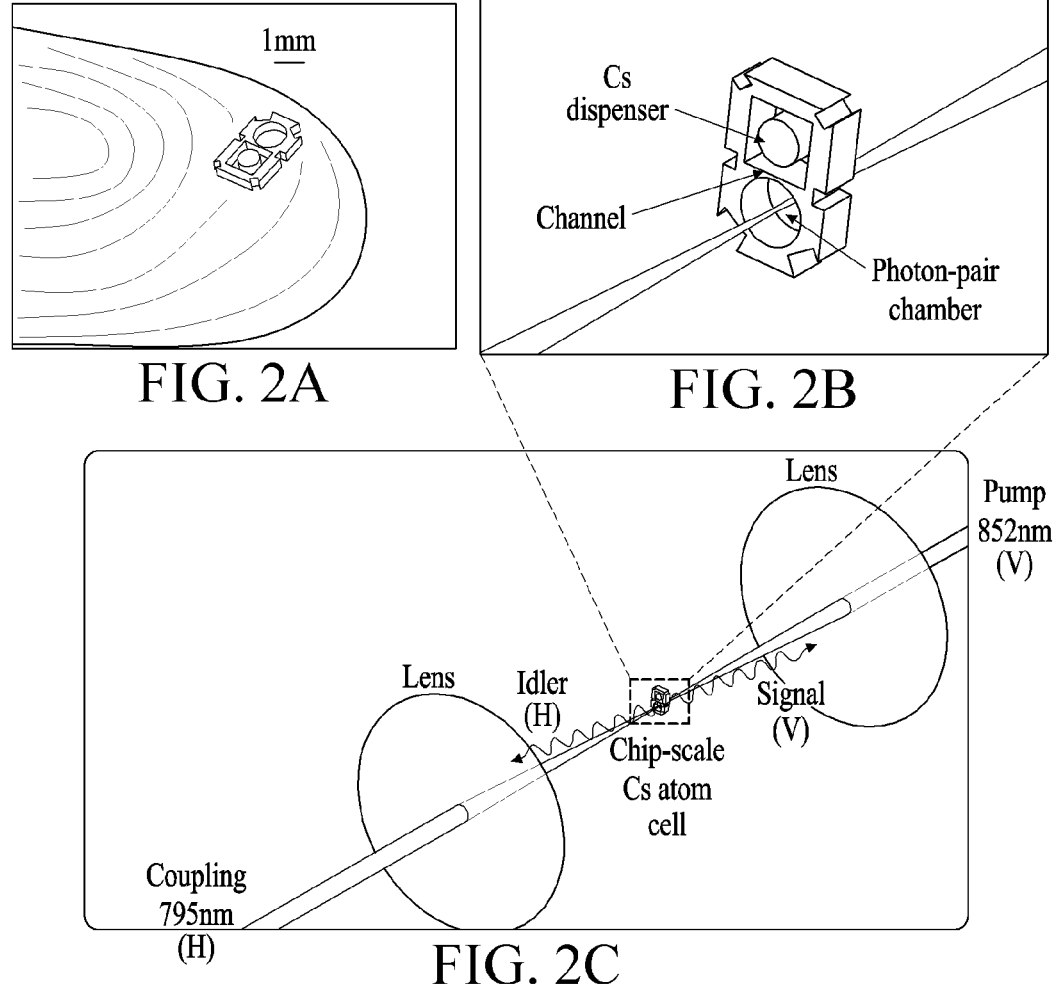
FIGS. 2A, 2B, and 2C are diagrams each illustrating an example of an atomic vapor cell that has a cesium (Cs) dispenser and generates a photon pair.

FIGS. 2A, 2B, and 2C are diagrams each illustrating examples of an atomic vapor cell that has a Cs dispenser and generates a photon pair.

As shown in FIG. 2, a quantum-entangled photon-pair light source 100 may produce an atomic vapor cell by anodic bonding a borosilicate wafer to both sides of a silicon wafer having open patterns as shown in FIG. 2. A Cs dispenser may be installed on the upper open pattern of the open patterns.

FIG. 2A is an example of a chip-scale atomic vapor cell.

The atomic vapor cell may be produced as small as 1 mm in size.

FIG. 2B may be a diagram illustrating the structure of the chip-scale atomic vapor cell.

The atomic vapor cell of FIG. 2B may have upper and lower open patterns that are connected to each other by a channel. The Cs dispenser may be installed on the upper open pattern. The open pattern on the lower part may function as a photon-pair chamber where a photon pair is generated.

FIG. 2C illustrates a process of generating a photon pair using Stimulated Four-Wave Mixing (SFWM) by the chip-scale atomic vapor cell.

In a state where Cs vapor emitted from the Cs dispenser moves to the photon-pair chamber through the channel and fills the photon-pair chamber, the atomic vapor cell may generate a photon pair of an idler (H) and a signal (V) by a pump laser beam (Pump 825 nm(V)) and a coupling laser beam (Coupling 795 nm(H)) A large-output laser of about 130 mW for about 30 seconds may concentrate on the Cs dispenser such that the Cs vapor may be activated and then move to the photon-pair chamber through the channel.

The radius and thickness of the photon-pair chamber may be produced to be 1.5 mm and 1 mm, respectively.

The temperature of the atomic vapor cell may be heated to about 85° C. The atomic vapor cell may be wrapped around with Mumetal to prevent line width broadening caused by a magnetic field.

The pump laser and the coupling laser may use an external-cavity diode laser (ECDL).

The pump laser and the coupling laser may enter the cell in directions opposite to each other so that as many atoms as possible satisfy two-photon coherence conditions in a Doppler-broadened warm atom ensemble.

The pump laser and the coupling laser may be concentrated on the atomic vapor cell by lenses having a vertical linear polarization and a focal length of 300 mm.

The frequency of the pump laser may be stabilized in a state where about 1.35 GHz detuning is provided at a transition line of $6P_{3/2}(F=5)-8S_{1/2}(F=4)$ through Saturated Absorption Spectroscopy (SAS) and a two-photon absorption signal.

In order to satisfy the conservation of angular momentum in the SFWM process, a signal photon and an idler photon may have vertical linear polarization.

In order to remove a noise signal caused by laser scattering in a single photon detector of PerkinElmer SPCM-AQRH-13HC, the quantum-entangled photon-pair light source 100 may separate components having an angle of about 2.3° from the lasers through a mirror and may filter components of the lasers once more using a frequency filter and a polarizer.

Signals obtained through two single photon detectors may be transmitted to a time-correlated single photon counter to obtain a normalized cross-correlation function.

The characteristics of a photon pair may be measured by changing two experimental factors.

One experimental factor may change the temperature of the cell and measure heralding efficiency according to optical depth (OD).

The other experimental factor may change the output of the pump laser to identify a photon generation rate and a changing pattern of a maximum value of the normalized cross-correlation function.

Figures 3A, 3B, 3C:
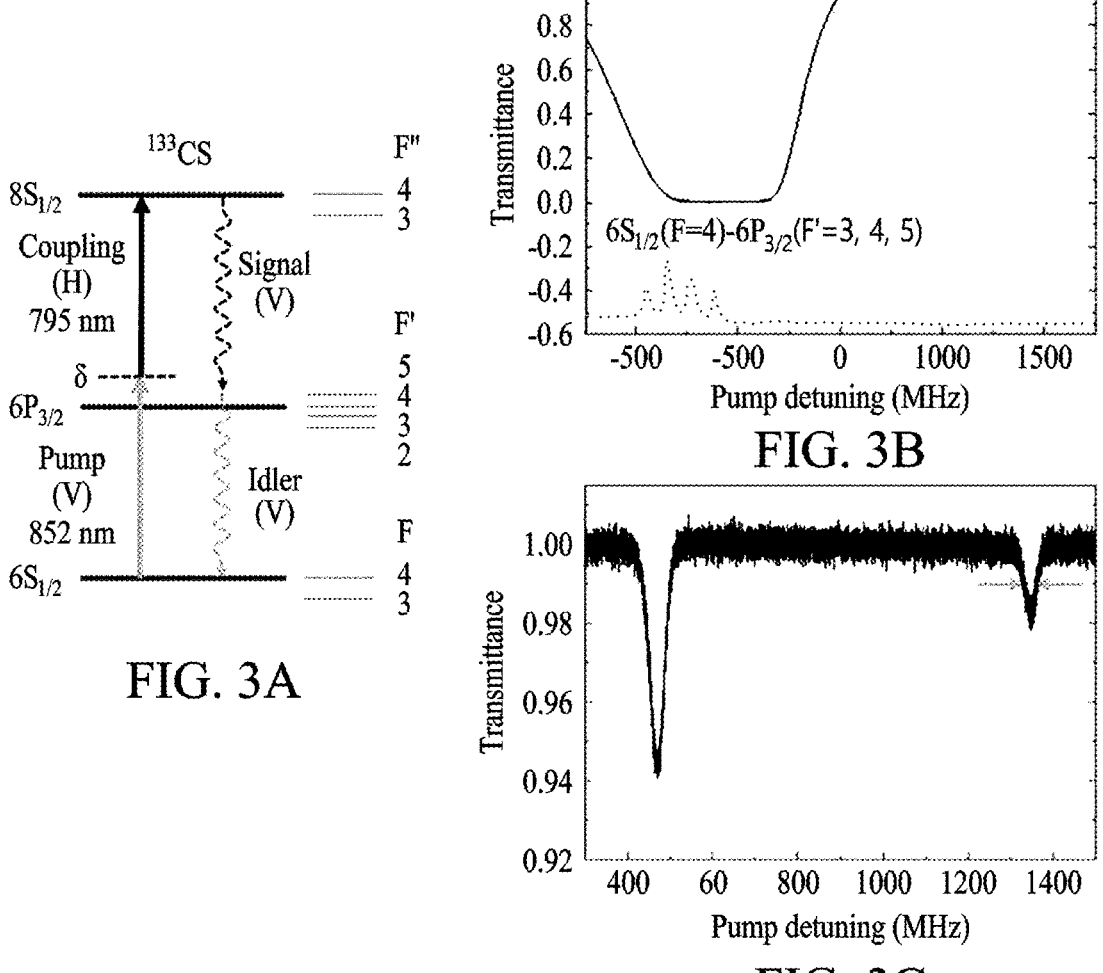
FIGS. 3A, 3B, and 3C are diagrams each illustrating an experimental configuration used to generate a photon pair from a Cs atomic ensemble.

FIGS. 3A, 3B, and 3C are diagrams illustrating an experimental configuration used to generate a photon pair from a Cs atomic ensemble.

FIG. 3A illustrates a process of emitting a signal photon and an idler photon by SFWM in a composition of a ladder-type transition line of $6S_{1/2}-6P_{3/2}-8S_{1/2}$ in $^{133}$Cs.

FIG. 3B illustrates a saturated absorption spectral signal (the lower solid line) and a transmission signal spectrum (the upper solid line) of a pump laser in a general atomic vapor cell.

FIG. 3C illustrates a two-photon absorption spectrum for transition of $6S_{1/2}(F=4)-6P_{3/2}(F=3, 4, 5)-8S_{1/2}(F=3, 4)$.

Referring to FIGS. 3A, 3B, and 3C, a two-photon absorption signal may be identified by measuring the transmission signal of pump light.

The two-photon absorption signal may be used to stabilize the frequency of the pump laser and obtain information about atomic velocity distribution satisfying two-photon coherence conditions through a line width.

The most critical factor determining the line width of the two-photon absorption signal may be two-photon Doppler broadening. When the pump laser and the coupling laser are projected into the cell in directions facing each other, the two-photon Doppler broadening may be calculated as Equation 1.

$$\omega_{two} = (k_p - k_c) \cdot v \qquad \text{[Equation 1]}$$

Here, k may denote a wave number vector, v may denote the velocity of an atom, p may denote the pump laser, and c may denote the coupling laser.

A pump laser of 852 nm and a coupling laser of 795 nm may bring line width broadening of about 18 MHz when the atomic velocity is v=210 m/s.

Other factors determining the line width of the two-photon absorption signal may include a natural line width (1.7 MHz) of an energy level and line width broadening (1.8 MHz) of a transmission time.

FIGS. 4A and 4B are diagrams each illustrating a two-photon waveform according to time.

FIG. 4A illustrates a normalized cross-correlation function (the solid line) between a signal photon and an idler photon.

FIG. 4B illustrates quantum beats among three SFWM channels in the case of passing $6P_{3/2}$ F'=3, 4, and 5 in a transition of $6S_{1/2}(F=4)-8S_{1/2}(F=4)$.

The time correlation of a generated photon pair may be identified with respect to FIGS. 4A and 4B.

A full width at half maximum may be about 4.9 ns. In the time correlation of the photon pair, quantum beats may be observed among the three SFWM channels that have passed $6P_{3/2}$F'=3, 4, and 5 in the transition of $6S_{1/2}(F=4)-8S_{1/2}$ (F=4).

The quantum-entangled photon-pair light source 100 may obtain a normalized cross-correlation function from a coincidence count by photons having no time correlation or electrical noise signals.

The quantum-entangled photon-pair light source 100 may further conduct an experiment to measure the autocorrelation of a single photon to demonstrate the violation of the Cauchy-Schwarz inequality and thus verify the nonclassicality of a photon pair. The Cauchy-Schwarz inequality may be as [Equation 2].

$$R = \frac{\left[g_{SI}^{(2)}(\tau)\right]^2}{g_{SS}^{(2)}(\tau)g_{II}^{(2)}(\tau)} \geq 1 \qquad \text{[Equation 2]}$$

Here, the measurement value may be $$g_{SS}^{(2)}(0) = 1.7, \ g_{II}^{(2)}(0) = 1.5, \ g_{SI}^{(2)max} = 622$$

and it may be confirmed that the Cauchy-Schwarz inequality may be violated by about 100,000 times.

Figure 5:
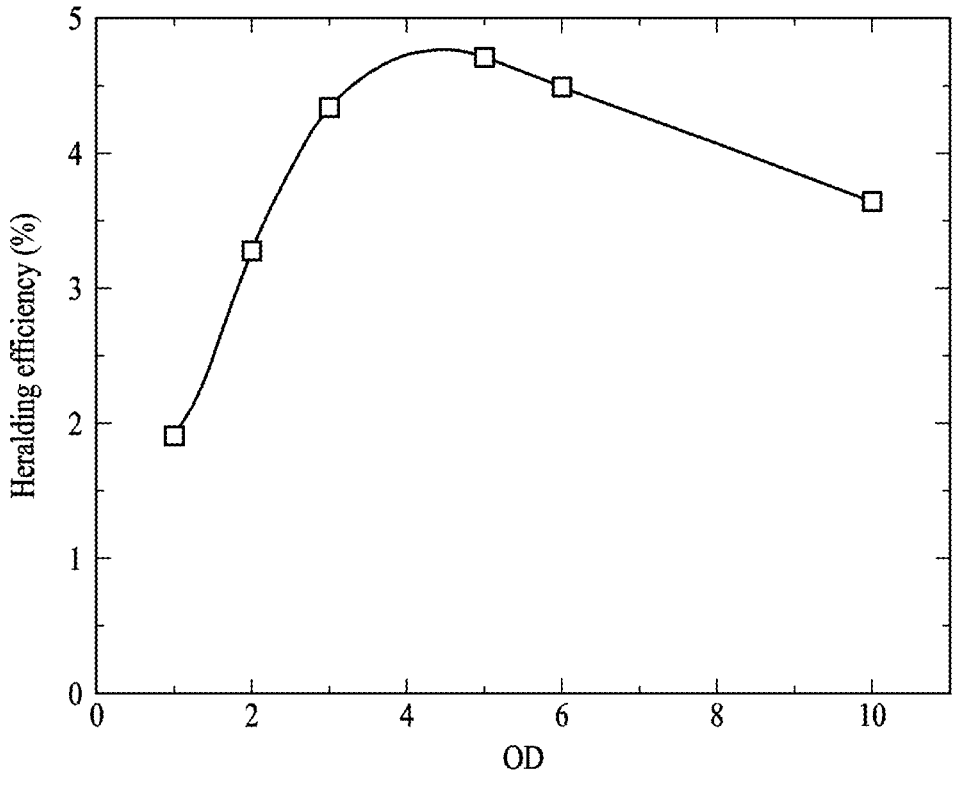
FIG. 5 is a diagram illustrating single photon heralding efficiency.

FIG. 5 is a diagram illustrating single photon heralding efficiency.

FIG. 5 illustrates heralding efficiency (shown as squares) according to OD when the OD changes from 1 to 10.

Figure 6A:
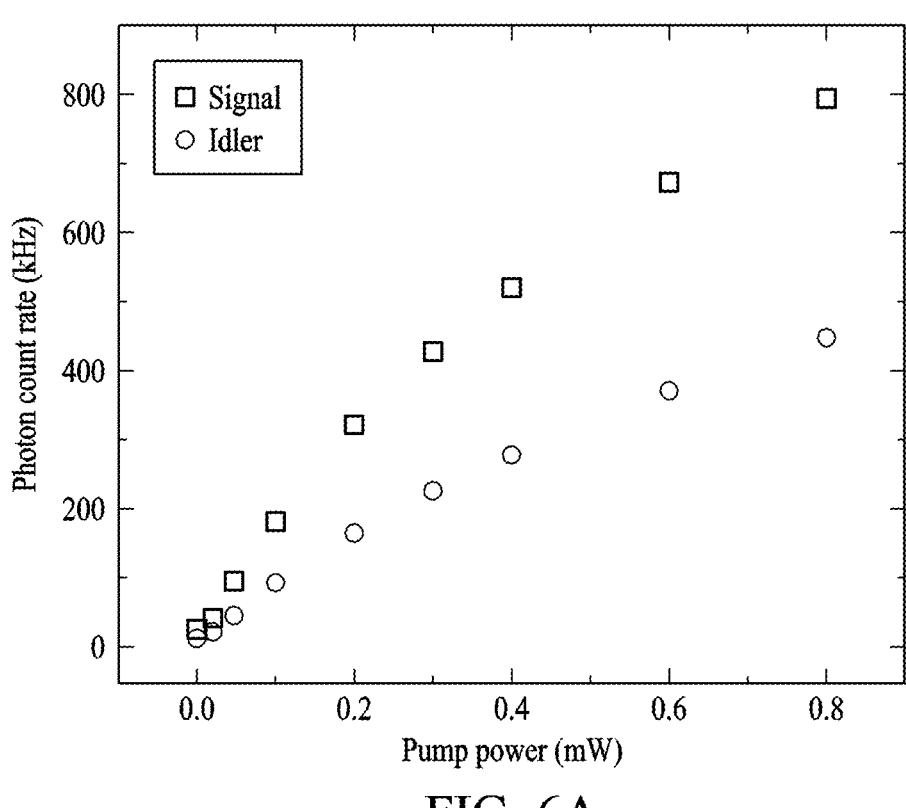
FIGS. 6A and 6B are diagrams each illustrating a photon-pair generation rate.
Figure 6B:
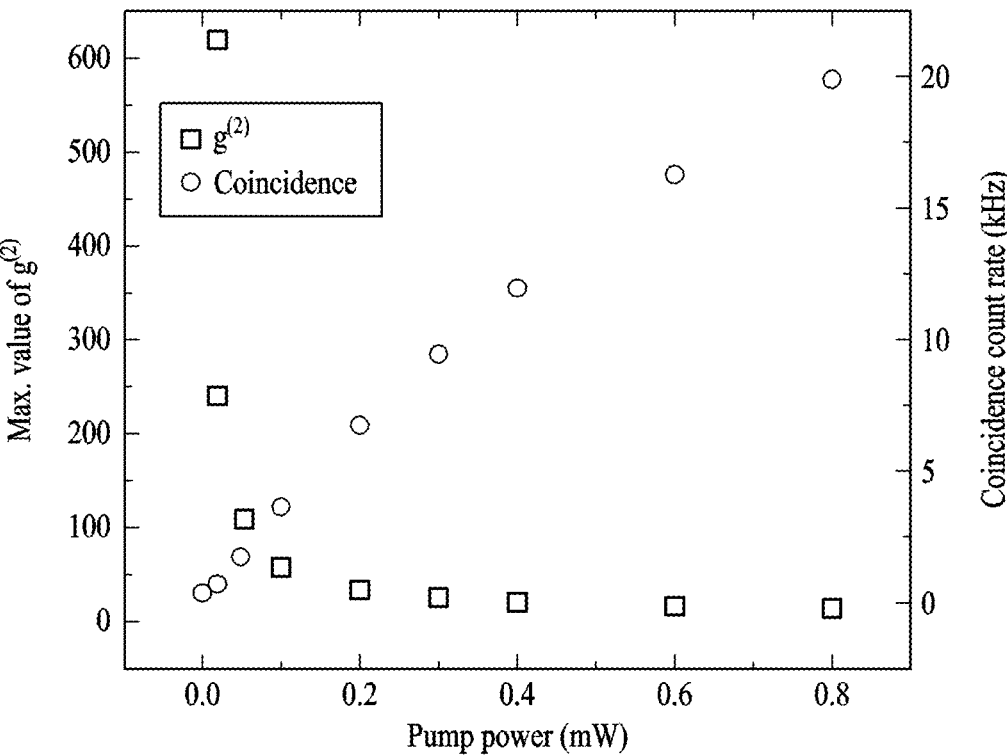

FIGS. 6A and 6B are diagrams each illustrating a photon-pair generation rate.

FIG. 6A illustrates the number of measured single photons per second according to the output of a pump laser when the output of a coupling laser is 5 mW.

FIG. 6B illustrates the maximum value of a normalized time cross-correlation function and a coincidence count per second according to the output of the pump laser when the output of the combined laser is 5 mW.

Figure 7A:
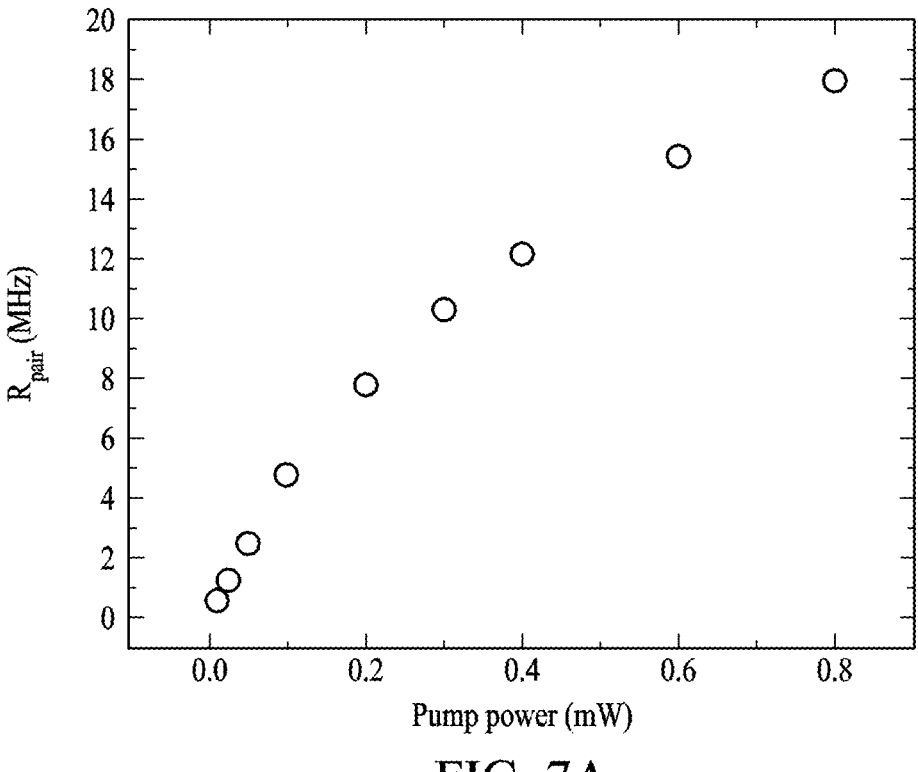
FIGS. 7A and 7B are diagrams each illustrating a photon-pair generation rate.
Figure 7B:
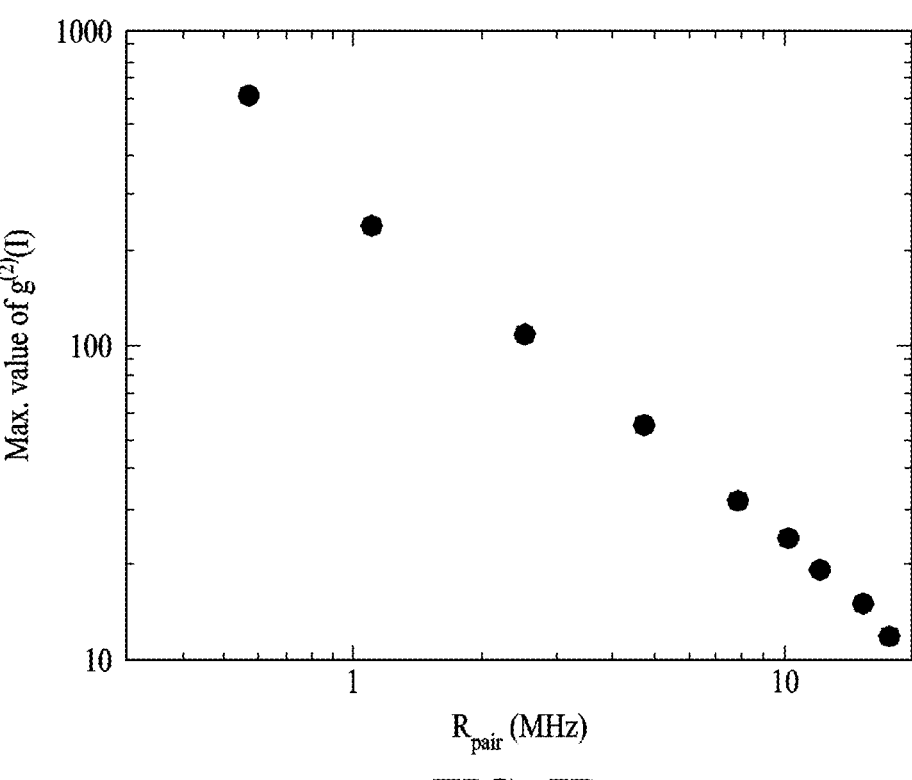

FIGS. 7A and 7B are diagrams illustrating a photon-pair generation rate.

FIG. 7A illustrates the number $R_{pair}$ of photon-pairs generated per second from Doppler-broadened warm atoms.

FIG. 7B illustrates the maximum value of $$g_{SI}^{(2)}(\tau)$$

according to $R_{pair}$.

FIGS. 5 to 7B illustrate confirmed results of photon-pair generation rates obtained by changing the output of OD and the pump laser and confirmed results of tendency of heralding efficiency.

An atomic density in the cell may be controlled by changing the temperature of an atomic vapor cell. However, in the case of using a temperature sensor having great uncertainty depending on the attaching position or surrounding environment of the temperature sensor, it may be confirmed, by optically measuring a transmission, that an atomic density may have a tendency according to OD.

FIG. 5 may be a measurement result of heralding efficiency according to OD.

The temperature change of the cell calculated theoretically based on transmittance may be from 52° C. to 85° C.

As the OD increases, the heralding efficiency may gradually increase and then decrease according to increasing effect where idler photons are reabsorbed in the cell. The heralding efficiency may have a maximum value around OD 5.

FIGS. 6A and 6B may be graphs each illustrating a photon pair generation rate obtained by changing the output of the pump laser, a count of coincident measurements of photon pairs (hereinafter, a coincidence count), and the maximum value of a normalized cross-correlation function when the output of coupling laser is fixed at 5 mW.

When the output of the pump laser is 10 μW, a signal photon and an idler photon may show generation rates of 19.7 kHz and 9.3 kHz, respectively.

When the time interval for the coincidence count is set to 8.8 ns, the coincidence count may be 320 Hz. In this case, the heralding efficiency may be about 3.4% and the maximum value of the cross-correlation function may be 622.

Figure 8:
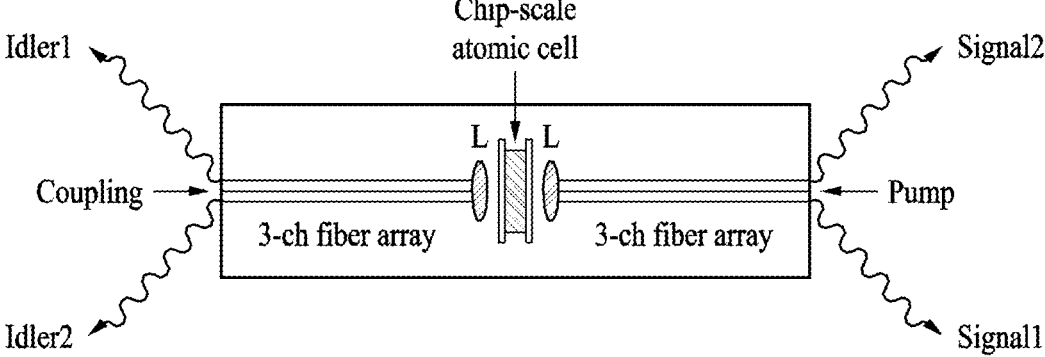
FIG. 8 is a diagram of a chip-scale atomic quantum light source using an optical fiber waveguide.

FIG. 8 is a diagram of a chip-scale atomic quantum light source using an optical fiber waveguide.

FIG. 8 illustrates a configuration for implementing a chip-scale atomic quantum light source.

In a quantum-entangled photon-pair light source 100, on an optical waveguide, an atomic vapor cell and a microlens may be attached to an optical fiber array of multiple channels. The quantum-entangled photon-pair light source 100 may transmit, to the center of an optical fiber, laser beams (coupling light and pump light) capable of filtering atoms. Quantum-entangled photon pairs generated in the miniature atomic vapor cell may be collected in optical fiber channels on both sides of the optical fiber.

FIG. 8 illustrates an example where the chip-scale vapor atomic cell is arranged on a fiber array of three channels with lenses (L) on both sides of the chip-scale atomic vapor cell, a coupling laser and a pump laser travel in directions opposite to each other through one channel in the center, and two photon pairs (Idler1-Signal1 and Idler2-Signal2), which are generated in the chip-scale atomic vapor cell, are output through the remaining two channels of the three channels.

Hereinafter, with reference to FIG. 9, described is a flow of implementing a quantum-entangled photon-pair light source 100 according to an embodiment.

Figure 9:
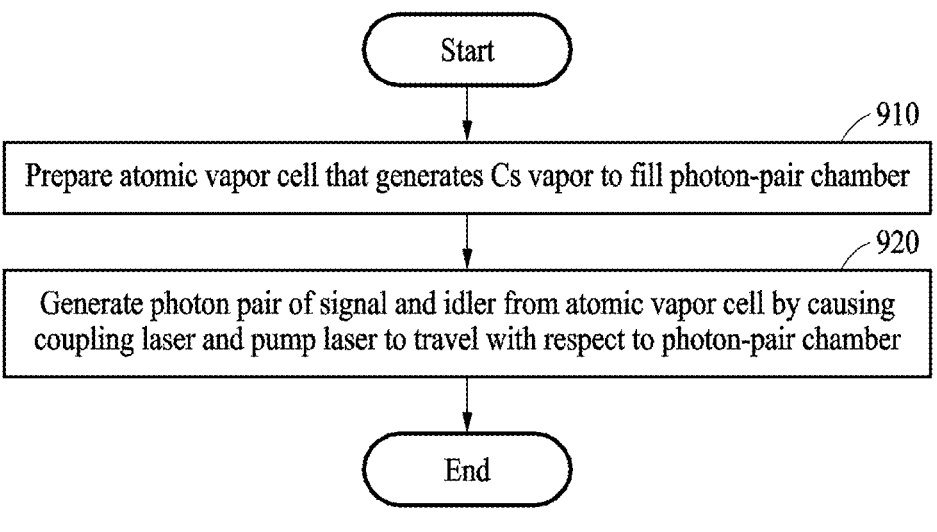
FIG. 9 is a flowchart illustrating a method of implementing a quantum-entangled photon-pair light source using a chip-scale atomic ensemble, according to an embodiment.

FIG. 9 is a flowchart illustrating a method of implementing a quantum-entangled photon-pair light source using a chip-scale atomic ensemble, according to an embodiment.

In operation 910, a quantum-entangled photon-pair light source 100 may first prepare an atomic vapor cell that generates Cs vapor to fill a photon-pair chamber. Operation 910 may include generating the Cs vapor in the atomic vapor cell and maintaining the generated Cs vapor in the closed photon-pair chamber.

The atomic vapor cell may include upper and lower open patterns connected to each other by channels.

A Cs dispenser configured to discharge the Cs vapor may be installed in the upper open pattern.

The atomic vapor cell may emit the Cs vapor by condensing a laser having a prescribed output in the Cs dispenser for a prescribed time.

The laser concentrated on the Cs dispenser may activate the Cs vapor from the Cs dispenser by concentrating the laser at a large output of, for example, about 130 mW for about seconds.

The lower open pattern may form the photon-pair chamber filled with the Cs vapor moving through the channel.

The photon-pair chamber of the atomic vapor cell may be formed of a glass tube filled with Cs vapor in a vacuum state. The Cs vapor in the atomic vapor cell may be manipulated (captured, pumped, and the like) by the coupling laser and the pump laser described below such that two photons, which are are a signal and an idler, may be generated. In this case, the generated two photons (a photon pair) may be in a quantum entangled state.

In an embodiment, the atomic vapor cell may be a chip-type cell that maintains the Cs vapor. The atomic vapor cell in the form of a chip may generate, by a simple device, a photon pair that is more stable than a conventional atomic medium.

According to an embodiment, the atomic vapor cell may be wrapped around with Mumetal to prevent line width broadening effect caused by a magnetic field. Mumetal may be a nickel alloy used to make materials for magnetic shielding and may be one of the materials that exhibit a high magnetic permeability in a weak magnetic field.

The processor of the quantum-entangled photon-pair light source 100 may cause the coupling laser and the pump laser to travel based on the photon-pair chamber and thus generate a photon pair of a signal and an idler from the atomic vapor cell. Operation 920 may include generating the photon pair through the manipulation of the coupling laser and the pump laser that travel in directions opposite to each other, with respect to the photon-pair chamber filled with the Cs vapor.

Here, the coupling laser may be a 795 nm laser of horizontal polarization and the pump laser may be a 852 nm laser of vertical polarization.

The horizontal polarization may refer to polarization in the horizontal direction based on the traveling direction of a laser and the vertical polarization may refer to polarization in the vertical direction based on the traveling direction of a laser.

The coupling laser and the pump laser may simultaneously travel in directions opposite to each other towards the atomic vapor cell at respective positions of the same distance from the atomic vapor cell. That is, the coupling laser of the horizontal polarization and the pump laser of the vertical polarization may travel in directions opposite to each other and reach the atomic vapor cell at the same time, such that the Cs vapor may be manipulated.

The processor of the quantum-entangled photon-pair light source 100 may generate the photon pair, in which the signal and the idler are in a vertical polarization relationship of horizontal polarization/vertical polarization or vertical polarization/horizontal polarization, by the coupling laser of the horizontal polarization and the pump laser of the vertical polarization. That is, the processor may cause each of the photons emitted from the atomic vapor cell to travel vertically and horizontally with respect to a propagation direction according to the manipulation of the coupling laser and the pump laser of the vertical polarization.

In addition, the coupling laser and the pump laser may fix a laser frequency at +1 GHz outside a Doppler broadening region in order to reduce uncorrelated photon pairs generated by photon resonance. That is, the coupling laser and the pump laser may cause their laser frequency to fall within a prescribed range such that a photon pair emitted from the atomic vapor cell may be in the polarization relationship of horizontal polarization/vertical polarization or vertical polarization/horizontal polarization, which is described above.

According to an embodiment, the quantum-entangled photon-pair light source 100 may be configured by adding thereto an optical fiber array.

The fiber optic array may include multiple channels and guide the traveling paths of the coupling laser and the pump laser to the photon-pair chamber.

The optical fiber array may include channels of three or more and may increase the multiple channels in the unit of an odd number (e.g., 5, 7, 9 . . . ).

The optical fiber array may determine one (preferably, the central channel) of the multiple channels to be the traveling path of the coupling laser and the pump laser.

The processor may emit the generated photon pair outwards along the optical fiber array of remaining channels of the multiple channels, except for a channel which the counting laser and the pump laser enter.

That is, the processor may determine the remaining channels of the optical fiber array, except for the channel through which the coupling laser and the pump laser travel, to be the travel paths of the generated photon pair.

In addition, the optical fiber array may increase the number of photon pairs generated from the atomic vapor cell by increasing the number of channels in the unit of an odd number.

For example, the optical fiber array of three channels may use the center channel as the path of the lasers and use the remaining two channels as the paths of two photon pairs (the signal and the idler).

When the number of channels increases to 5, the optical fiber array 130 of five channels may use the center channel as the path of the lasers and use the remaining four channels as the paths of four photon pairs (the signal and the idler).

An embodiment of the present disclosure may provide a quantum entangled photon pair light source using a chip-scale atomic ensemble and an implementation method thereof by implementing a photon-pair generation system using a chip-scale atomic vapor cell such that an existing photon-pair generation system may be miniaturized to a portable equipment scale.

In addition, an embodiment of the present disclosure may dramatically reduce the size of a photon-pair generation system by applying the photon-pair generation system to optical fiber array technology or optical wave technology and may develop various quantum devices, such as a quantum memory based on an atomic ensemble or a single-photon light source.

In addition, an embodiment of the present disclosure may implement a bright and powerful quantum-entangled photon-pair light source by utilizing a strong signal-idler polarization correlation using an atomic vapor cell.

In addition, an embodiment of the present disclosure may develop a quantum-entangled photon-pair light source with a high generation rate using a low pump output.

The methods according to the above-described examples may be recorded in non-transitory computer-readable media including program instructions to implement various operations of the above-described examples. The media may also include, alone or in combination with the program instructions, data files, data structures, and the like. The program instructions recorded on the media may be those specially designed and constructed for the purposes of examples, or they may be of the kind well-known and available to those having skill in the computer software arts. Examples of non-transitory computer-readable media include magnetic media such as hard disks, floppy disks, and magnetic tape; optical media such as CD-ROM discs or DVDs; magneto-optical media such as optical discs; and hardware devices that are specially configured to store and perform program instructions, such as read-only memory (ROM), random access memory (RAM), flash memory, and the like. Examples of program instructions include both machine code, such as produced by a compiler, and files containing higher-level code that may be executed by the computer using an interpreter. The above-described devices may be configured to act as one or more software modules in order to perform the operations of the above-described examples, or vice versa.

The software may include a computer program, a piece of code, an instruction, or one or more combinations thereof, to independently or collectively instruct or configure the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network-coupled computer systems so that the software is stored and executed in a distributed fashion. The software and data may be stored by one or more non-transitory computer-readable recording mediums.

While the examples are described with reference to drawings, it will be apparent to one of ordinary skill in the art that various alterations and modifications in form and details may be made in these examples without departing from the spirit and scope of the claims and their equivalents. For example, suitable results may be achieved if the described techniques are performed in a different order, and/or if components in a described system, architecture, device, or circuit are combined in a different manner, and/or replaced or supplemented by other components or their equivalents.

Accordingly, other implementations are within the scope of the following claims.

What is claimed is:

1. A quantum-entangled photon-pair light source using a chip-scale atomic ensemble, the quantum-entangled photon-pair light source comprising:

an atomic vapor cell configured to generate cesium (Cs) vapor to fill a photon-pair chamber;

a processor configured to cause a coupling laser and a pump laser to travel based on the photon-pair chamber and generate a photon pair of a signal and an idler from the atomic vapor cell; and an optical fiber array of multiple channels, which guides a traveling path of the coupling laser and a traveling path of the pump laser towards the photon-pair chamber, wherein the processor is configured to emit the generated photon pair outwards along the optical fiber array of remaining channels of the multiple channels, except for a channel which the coupling laser and the pump laser enter.

2. The quantum-entangled photon-pair light source of claim 1, wherein the atomic vapor cell:

comprises an upper open pattern and a lower open pattern that are connected to each other by a channel;

in the upper open pattern, is equipped with a Cs dispenser configured to discharge the Cs vapor; and in the lower open pattern, forms the photon-pair chamber filled with the Cs vapor moving through the channel.

3. The quantum-entangled photon-pair light source of claim 2, wherein the atomic vapor cell is configured to discharge the Cs vapor by concentrating a laser having a prescribed output on the Cs dispenser for a prescribed time.

4. The quantum-entangled photon-pair light source of claim 2, wherein the atomic vapor cell is wrapped around with Mumetal to prevent line width broadening caused by a magnetic field.

5. The quantum-entangled photon-pair light source of claim 1, wherein the coupling laser is a 795 nm laser of horizontal polarization, the pump laser is an 852 nm laser of vertical polarization, and the coupling laser and the pump laser simultaneously travel in directions opposite to each other towards the atomic vapor cell at respective positions of a same distance from the atomic vapor cell.

6. The quantum-entangled photon-pair light source of claim 5, wherein the processor is configured to generate the photon pair, in which the signal and the idler are in a vertical polarization relationship of horizontal polarization/vertical polarization or vertical polarization/horizontal polarization, by the coupling laser of the horizontal polarization and the pump laser of the vertical polarization.

7. The quantum-entangled photon-pair light source of claim 1, wherein the optical fiber array increases a number of multiple channels in a unit of an odd number to increase a number of photon pairs generated from the atomic vapor cell.

8. A method of implementing a quantum-entangled photon-pair light source using a chip-scale atomic ensemble, the method comprising:

generating, by an atomic vapor cell, cesium (Cs) vapor to fill a photon-pair chamber;

generating, by a processor, a photon pair of a signal and an idler from the atomic vapor cell by causing a coupling laser and a pump laser to travel based on the photon-pair chamber;

guiding, by an optical fiber array of multiple channels, a traveling path of the coupling laser and a traveling path of the pump laser towards the photon-pair chamber; and emitting, by the processor, the generated photon pair outwards along the optical fiber array of remaining channels of the multiple channels, except for a channel which the coupling laser and the pump laser enter.

9. The method of claim 8, wherein the atomic vapor cell:

comprises an upper open pattern and a lower open pattern that are connected to each other by a channel;

in the upper open pattern, is equipped with a Cs dispenser configured to discharge the Cs vapor; and in the lower open pattern, forms the photon-pair chamber filled with the Cs vapor moving through the channel.

10. The method of claim 9, further comprising discharging the Cs vapor by concentrating a laser having a prescribed output on the Cs dispenser for a prescribed time.

11. The method of claim 9, wherein the atomic vapor cell is wrapped around with Mumetal to prevent line width broadening caused by a magnetic field.

12. The method of claim 8, wherein

15

16 the coupling laser is a 795 nm laser of horizontal polarization, the pump laser is an 852 nm laser of vertical polarization, and the coupling laser and the pump laser simultaneously travel in directions opposite to each other towards the atomic vapor cell at respective positions of a same distance from the atomic vapor cell.

13. The method of claim 12, wherein the generating of the photon pair comprises generating the photon pair, in which the signal and the idler are in a vertical polarization relationship of horizontal polarization/vertical polarization or vertical polarization/horizontal polarization, by the coupling laser of the horizontal polarization and the pump laser of the vertical polarization.

14. The method of claim 8, wherein the optical fiber array is configured to increase a number of multiple channels in a unit of an odd number to increase a number of photon pairs generated from the atomic vapor cell.

15. A non-transitory computer-readable storage medium storing instructions that, when executed by a processor, cause the processor to perform the method of claim 8.

\* \* \* \* \*